United States Patent [19]

Choushi et al.

[11] Patent Number: 4,615,324
[45] Date of Patent: Oct. 7, 1986

[54] EXHAUST GAS RECIRCULATION SYSTEM FOR A V-TYPE ENGINE

[75] Inventors: Masahiro Choushi; Haruyoshi Ishimi, both of Hiroshima, Japan

[73] Assignee: Mazda Motor Corporation, Japan

[21] Appl. No.: 647,478

[22] Filed: Sep. 5, 1984

[30] Foreign Application Priority Data

Sep. 13, 1983 [JP] Japan .................................. 58-169980

[51] Int. Cl.[4] ............................................ F02M 25/06
[52] U.S. Cl. ............................. 123/568; 123/52 MV
[58] Field of Search .................. 123/52 MV, 568, 569, 123/570, 52 M

[56] References Cited

U.S. PATENT DOCUMENTS

| | | | |
|---|---|---|---|
| 2,652,040 | 9/1953 | Tritt | 123/568 |
| 3,171,393 | 3/1965 | Platner et al. | 123/52 MV |
| 3,303,832 | 2/1967 | Platner et al. | 123/52 M |
| 3,446,196 | 5/1969 | Daigh | 123/568 |
| 3,783,845 | 1/1974 | Brandstetter | 123/52 MV |
| 4,060,061 | 11/1977 | Might | 123/568 X |
| 4,267,812 | 5/1981 | Aula et al. | 123/52 MV X |
| 4,276,865 | 7/1981 | Hamai | 123/568 X |

FOREIGN PATENT DOCUMENTS 0035318  3/1978  Japan .

Primary Examiner—Willis R. Wolfe, Jr.
Attorney, Agent, or Firm—Gerald J. Ferguson, Jr.; James E. Bryan; Michael P. Hoffman

[57] ABSTRACT

A V-type engine having a pair of cylinder banks set at an angle to each other is provided with a plurality of separate intake passages, each for one cylinder. The intake passages have respective proximate portions at which the intake passages to the cylinders in one cylinder bank and those to the cylinders in the other cylinder bank are in proximity or aligned with each other as viewed in the direction of the crankshaft. An exhaust recirculation passage for recirculating exhaust gas from the exhaust passage to the cylinders extends along the proximate portions in the direction of the crankshaft and is communicated with each intake passage by way of a communicating hole.

19 Claims, 6 Drawing Figures

F I G. 5
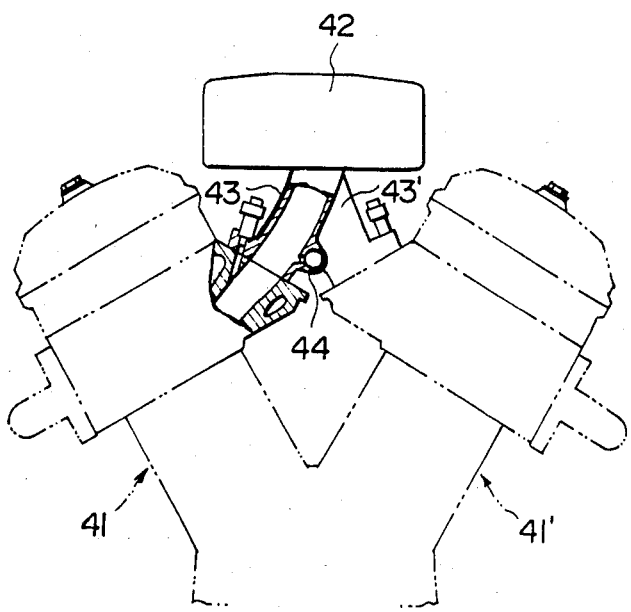

EXHAUST GAS RECIRCULATION SYSTEM FOR A V-TYPE ENGINE

BACKGROUND OF THE INVENTION

1. Field of the Invention

This invention relates to an exhaust gas recirculation system for a V-type engine mainly mounted on a vehicle.

2. Description of the Prior Art

In order to increase engine output, the volumetric efficiency must be improved. The volumetric efficiency can be effectively improved by reducing curvature in the intake passage to reduce intake resistance and/or by separating the intake passages for the respective cylinders and elongating the intake passages to make the best use of so-called intake inertia.

However in the case of engines for a vehicle which must be accommodated within a limited space in the engine room, especially in the case of cumbersome V-type engines having a pair of cylinder banks, it is very difficult to provide separate intake passages having a sufficient length and reduced curvature. Therefore, it has been often in the V-type engines that the volumetric efficiency is sacrificed.

In a V-type engine proposed in U.S. Pat. No. 3,303,832 (particularly in FIGS. 1 and 2 thereof), a pair of common passages are provided above the respective cylinder banks to extend in parallel to the crankshaft, and intake passages for the cylinders in one cylinder bank are provided to separately diverge from the common passage above the other cylinder bank so that the intake passages for the cylinders in the pair of cylinder banks extend across each other. With this arrangement, intake passages having a desired length and reduced curvature can be separately provided to effectively improve the volumetric efficiency, thereby improving engine output.

However the V-type engine disclosed in the United States Patent has problems with recirculation of exhaust gas that in order to send back exhaust gas into intake gas to control emission, an exhaust recirculating passage must be connected to each intake passage, thereby significantly complicating piping, and it is very difficult to uniformly distribute recirculated exhaust gas to the cylinders. When the recirculated exhaust gas is not uniformly distributed to the cylinders, combustion in the cylinders changes from cylinder to cylinder.

In Japanese Unexamined Utility Model Publication No. 53(1978)-35318, there is disclosed an exhaust gas recirculation system for an in-line type engine which is directed to improving distribution of the recirculated exhaust gas. However, if the system is directly applied to a V-type engine, a recirculation pipe must be provided for each cylinder bank to complicate the structure.

SUMMARY OF THE INVENTION

In view of the foregoing observations and description, the primary object of the present invention is to provide an improved exhaust gas recirculation system for a V-type engine having separated intake passages for the individual cylinders which is very simple in structure and can distribute exhaust gas substantially uniformly to the cylinders.

The exhaust gas recirculation system for a V-type engine in accordance with the present invention is provided with a plurality of separate intake passages, each for one cylinder. The intake passages have respective proximate portions at which the intake passages to the cylinders in one cylinder bank and those to the cylinders in the other cylinder bank are in proximity or aligned with each other as viewed in the direction of the crankshaft. An exhaust recirculation passage for recirculating exhaust gas from the exhaust passage to the cylinders extends along the proximate portions in the direction of the crankshaft and is communicated with each intake passages by way of a communicating hole.

With this arrangement, exhaust gas can be recirculated by only providing single pipe and can be substantially uniformly distributed to the cylinders.

BRIEF DESCRIPTION OF THE DRAWINGS

FIG. 5 is a schematic end view of a V-type engine employing an exhaust gas recirculating system in accordance with another embodiment of the present invention.

DESCRIPTION OF THE PREFERRED EMBODIMENT

Figure 1:
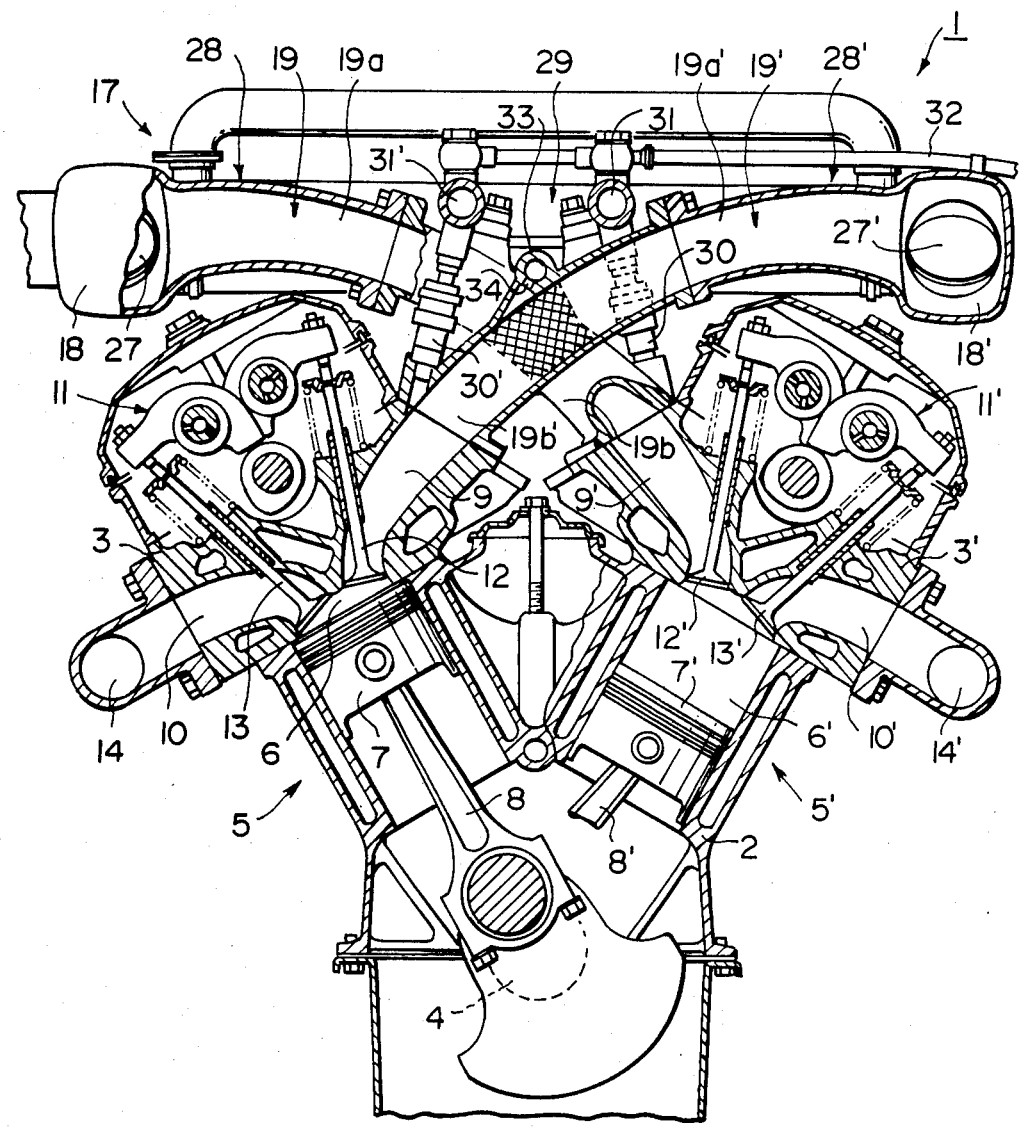
FIG. 1 is a cross-sectional view showing a V-type engine employing an exhaust gas recirculating system in accordance with an embodiment of the present invention.

In FIG. 1, a V-type engine 1 has a cylinder block 2, a pair of cylinder heads 3 and 3' and a pair of cylinder banks 5 and 5' set at an angle to each other. In each cylinder bank, a plurality (three in this particular embodiment as can be seen from FIG. 2) of cylinders 6 and 6' are provided in a row extending in parallel to the crankshaft 4. Pistons 7 and 7' are fit into the respective cylinders 6 and 6' and are connected to the crankshaft 4 by way of connecting rods 8 and 8'.

The cylinder heads 3 and 3' are provided with intake ports 9 and 9' and exhaust ports 10 and 10' communicating with cylinders 6 and 6'. The intake ports 9 and 9' and the exhaust ports 10 and 10' are respectively provided with intake valves 12 and 12' and exhaust valves 13 and 13' which are driven by valve trains 11 and 11'. On the outer sides of the respective cylinders heads 3 and 3' are provided exhaust passages 14 and 14' into which the exhaust ports 10 and 10' merge and which extends rearward of the engine 1. The exhaust passages 14 and 14' are provided with catalytic converters 15 and 15' and merge into each other downstream of the converters 15 and 15', and then open to the atmosphere by way of a silencer 16.

In the space between the cylinder banks 5 and 5' and above the cylinder banks 5 and 5' is provided an air-intake device 17 for supplying air to the cylinders 6 and 6' through the intake ports 9 and 9'. The air-intake device 17 comprises a pair of surge tanks 18 and 18' which are disposed above the cylinder banks 5 and 5' to extend substantially in the direction of the crankshaft and are closed at one end. As clearly shown in FIG. 2, three branch intake passages 19 extend from the surge tank 18 above the cylinder bank 5 toward the respective intake ports 9' of the cylinders 6' in the opposite cylinder bank 5' and three branch intake passages 19' similarly extend from the surge tank 18' above the cylinder bank 5' toward the respective intake ports 9 of the cylinders 6 in the opposite cylinder bank 5. Thus the branch intake passages 19 and 19' extend across each other. The open ends of the surge tank 18 and 18' are connected with each other by way of a throttle body 20, a trifurcate pipe 21, a communicating pipe 23 extending substantially in perpendicular to the crankshaft 4, a connecting pipe 22, and a throttle body 20'. An air-cleaner 25 is connected, by way of an airflow meter 24, to the end of the trifurcated pipe 21 open laterally outwardly.

In the throttle bodies 20 and 20' are respectively disposed throttle valves 27 and 27' which are driven by a throttle lever 26 by way of an interlocking shaft 26a.

The surge tanks 18 and 18', and the branch intake passages 19 and 19' are formed of three pieces, one being a first surge tank section 28 comprising the surge tank 18 and the upstream portions 19a of the branch intake passages 19 extending from the surge tank 18 which are integrally molded, another being a second surge tank section 28' comprising the surge tank 18' and the upstream portions 19a' of the branch intake passages 19' extending from the surge tank 18' which are integrally molded, and a cross-manifold section 29 comprising alternately arranged downstream portions 19b and 19b' of the branch intake passages 19 and 19'. In the downstream portions 19b and 19b' of the branch intake passages 19 and 19' in the cross-manifold section 29 are mounted fuel injection nozzles 30 and 30' directed toward the corresponding intake ports 9 and 9'. The fuel injection nozzles 30 and 30' are pressed against the branch intake passages 19 and 19' to be fixed thereto by fuel distributing pipes 31 and 31' which are fixed to the upper surface of the cross-manifold section 29. Fuel is distributed to the fuel injection nozzles 30 and 30' from a fuel supply pipe 32 by way of the fuel distributing pipes 31 and 31'.

Figure 2:
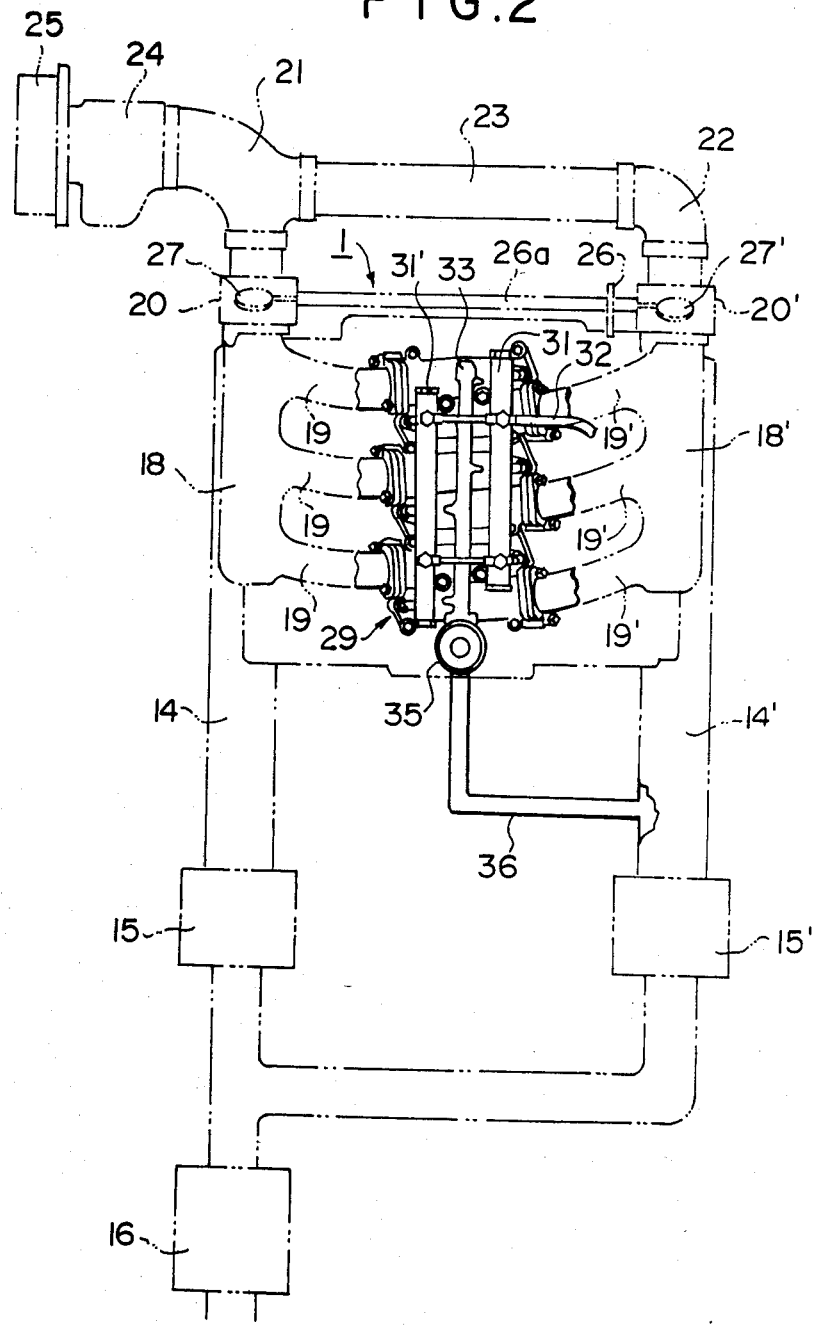
FIG. 2 is a schematic plan view of the engine shown in FIG. 1.
Figure 3:
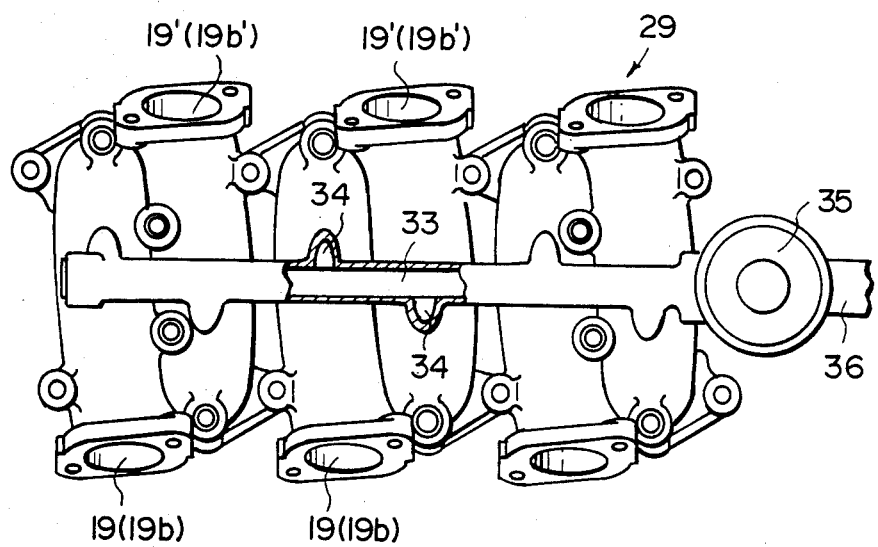
FIG. 3 is an enlarged fragmentary plan view of the engine shown in FIG. 1.
Figure 4:
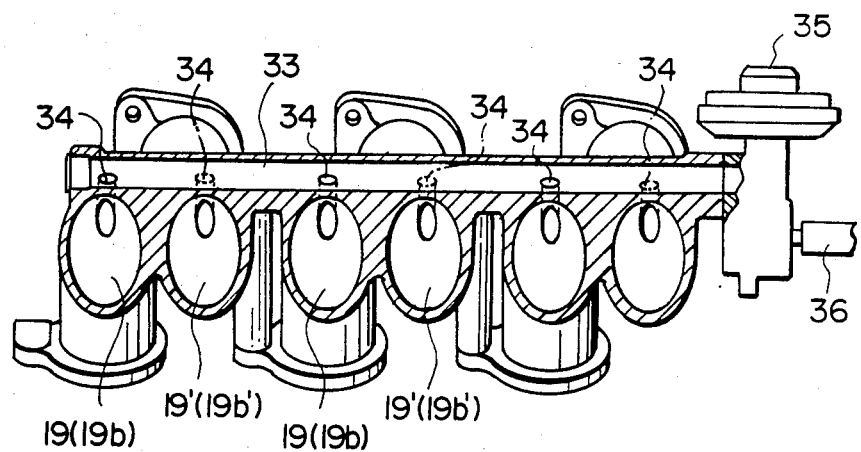
FIG. 4 is an enlarged fragmentary cross-sectional view of the same.

As can be seen from FIGS. 1 and 2, the six branch intake passages 19 and 19' respectively have portions cross-hatched portion in FIG. 1 in the cross-manifold section 29 which are all aligned with each other in the direction of the crankshaft 4. An exhaust recirculation passage 33 is provided to extend in the direction of the crankshaft 4 and to join the upper sides of the aligned portions of the branch intake passages 19 and 19'. As shown in FIGS. 1, 3 and 4, the exhaust recirculation passage 33 is communicated with the downstream portions 19b and 19b' of the branch intake passages 19 and 19' by way respective communicating holes 34 each of which is directed in the direction of intake air flowing through the corresponding intake passages 19 or 19'. The exhaust recirculation passage 33 is closed at one end and opens at the other end. The exhaust recirculation passage 33 is provided in the open end with a recirculation control valve 35 for controlling the amount of exhaust gas to be recirculated according to the operating condition of the engine. To the recirculation control valve 35 is connected a branch exhaust passage 36 which communicates the valve 35 with one of the exhaust passages 14 and 14'.

Intake air drawn through the air cleaner 25 is divided into two parts by the trifurcated pipe 21 after passing through the airflow meter 24, one being introduced into one surge tank 18 by way of the throttle valve 27, and the other being introduced into the other surge tank 18' by way of the communicating pipe 23, the connecting pipe 22 and the throttle valve 27'. Then the intake air is introduced from the surge tanks 18 and 18' into the cylinders 6' and 6 in the cylinder banks 5' and 5 opposite to the surge tank by way of the branch intake passages 19 and 19' and the intake ports 9' and 9.

Exhaust gas generated in the cylinders 6 and 6' is discharged from the respective exhaust ports 10 and 10' to be introduced into the exhaust passages 14 and 14'. Then the exhaust gas is discharged to the atmosphere via the catalytic converters 15 and 15' and the silencer 16. However a part of the exhaust gas flowing through the exhaust passage 14' is introduced into the exhaust recirculation passage 33 by way of the branch exhaust passage 36 and the exhaust recirculation control valve 35. Then the exhaust gas is introduced into the branch intake passages 19 and 19' of the air-intake device 17 through the respective communicating holes 34 and further to the cylinders together with the intake air.

Since the exhaust recirculation passage 33 is provided to extend along the aligned portions of the branch intake passages 19 and 19' extending on opposite sides of the cross-manifold 29 and the exhaust recirculation passage 33 is communicated with the respective branch intake passages 19 and 19' by way of the communicating holes 34, exhaust gas can be substantially uniformly distributed to the branch intake passages 19 and 19' or the cylinders 6 and 6' without providing an exhaust recirculation passage for each branch intake passage. Further, since the communicating holes are directed in the direction of the intake air flowing through the corresponding intake passages 19 or 19', the recirculated exhaust gas smoothly merges into the intake air.

Though in the above embodiment, the branch intake passages 19 and 19' are provided to extend from the surge tanks 18 and 18' on the respective cylinder banks 5 and 5' to the cylinders 6' and 6 in the opposite cylinder banks 5' and 5, and the exhaust recirculation passage 33 is provided to join the aligned portions of the branch intake passages 19 and 19' which are all aligned with each other in the direction of the crankshaft 4, the present invention need not be limited to the arrangement. For example, in another embodiment of the present invention shown in FIG. 5, branch intake passages 43 and 43' extend from a single surge tank 42 provided in the middle between cylinder banks 41 and 41' to the respective cylinder banks 41 and 41', and an exhaust recirculation passage 44 is provided to join the lower sides of the aligned portions of the branch intake passages 43 and 43' all aligned with each other in the direction of the crankshaft. The surge tank 42 may be either a single compartment type having only one compartment with which the branch intake passages to both the cylinder banks are communicated, or a dual compartment type having a pair of compartments, each for the branch intake passages to one cylinder bank.

Figure 6:
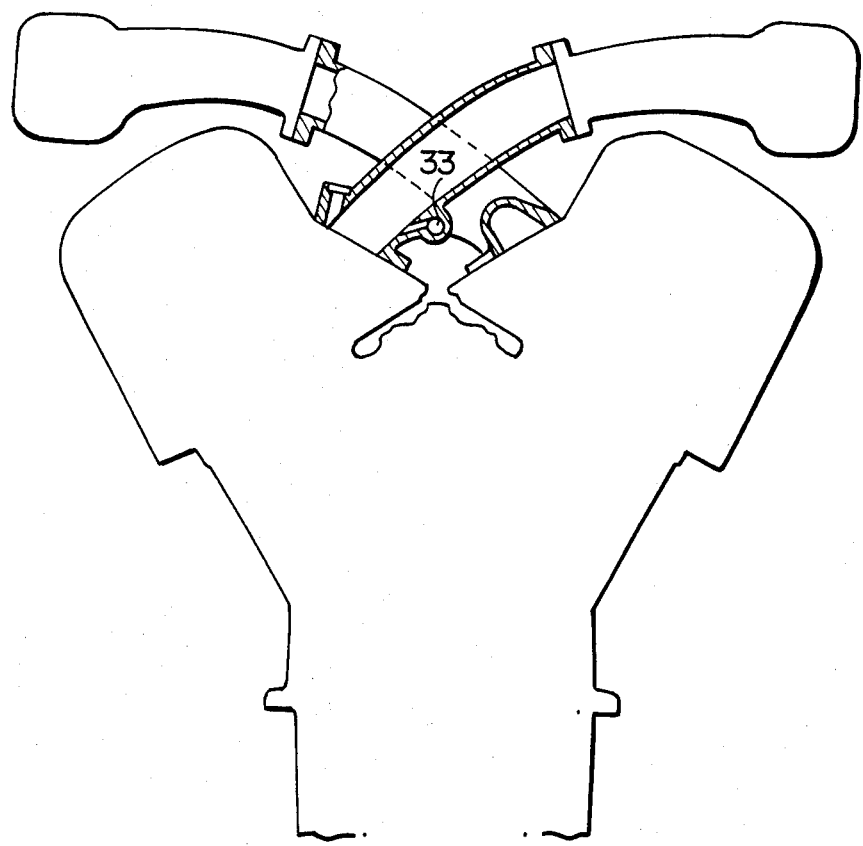
FIG. 6 is a schematic front elevational view partly in cross section showing a modification of the embodiment of FIG. 1.

Further, though in the embodiment shown in FIG. 1, the exhaust recirculation passage 33 is provided to join the upper sides of the aligned portions of the branch intake passages 19 and 19', it may be provided to join the lower sides of the same as indicated at 33' in FIG. 6.

Further, the branch intake passages need neither to be partly aligned with each other nor to extend across each other provided that the branch intake passages extending to one cylinder bank are at least partly in proximity to the branch intake passages extending to the other cylinder bank as viewed in the direction of the crankshaft.

What is claimed is:

1. In an exhaust gas recirculation system for a V-type engine having a pair of cylinder banks arranged at an angle to each other on opposite sides of a crankshaft, each cylinder bank having a plurality of cylinders therein and an intake passage being separately provided for each cylinder, the improvement which comprises that the intake passages have respective proximate portions at which the intake passages to the cylinders in one cylinder bank and the intake passages to the cylinders in the other cylinder bank are aligned with each other as viewed in the direction of the crankshaft, said proximate portions being in the middle of the engine between the cylinder banks, an exhaust recirculation passage for recirculating exhaust gas from an exhaust passage to the cylinders extending along the proximate portions in the direction of the crankshaft and communicating with each intake passage by way of a communicating aperture, said exhaust recirculation passage extending in the middle of the engine between the cylinder banks in the direction of the crankshaft and having an open end in proximity to the most remote intake passage as viewed in the direction of the crankshaft, an exhaust recirculation valve, for controlling the amount of exhaust gas, in the open end of said exhaust recirculation passage, and a branch exhaust passage, one end of which communicates with the exhaust recirculation passage by way of the exhaust recirculation valve and the other end of which communicates with an exhaust passage of the engine.

2. An exhaust gas recirculation system as defined in claim 1 in which said intake passages are communicated with an air-intake means for supplying air to said engine, said air-intake means being provided above said cylinder banks, said air-intake means comprising a first portion and a second portion, said first portion connected to said intake passages to the cylinders in one cylinder bank and said second portion connected to said intake passages to the cylinders in the other cylinder bank.

3. An exhaust gas recirculation system as defined in claim 1 in which said exhaust recirculation passage extends along the upper sides of the proximate portions.

4. An exhaust gas recirculation system as defined in claim 1 in which said intake passages are communicated with a single surge tank provided in the middle between the cylinder banks, said proximate portions of the respective intake passages positioned downstream of the surge tank, said intake passages extending to the cylinders in one cylinder bank and said intake passages extending to the cylinders in the other cylinder bank crossing in the middle between the cylinder banks.

5. An exhaust gas recirculation system as defined in claim 1 in which said exhaust recirculation passage extends along the lower sides of the proximate portions.

6. An exhaust gas recirculation system as defined in claim 5 in which said intake passages are communicated with a single surge tank provided in the middle between the cylinder banks, and said proximate portions of the respective intake passages are positioned downstream of the surge tank.

7. An exhaust gas recirculation system as defined in claim 1 in which the intake passages extending to the cylinders in one cylinder bank and those extending to the cylinders in the other cylinder bank cross in the middle between the cylinder banks, and said proximate portions are the portions of the intake passages which are aligned with each other in the direction of the crankshaft.

8. An exhaust gas recirculation system as defined in claim 7 in which said exhaust recirculation passage extends along the lower sides of the proximate portions.

9. An exhaust gas recirculation system as defined in claim 7 in which said exhaust recirculation passage extends along the upper sides of the proximate portions.

10. An exhaust gas recirculation system as defined in claim 1 in which said exhaust recirculation passage is formed of a linearly extending tubular member and communicates with the exhaust passage by way of an exhaust recirculation valve directly attached to one end of the exhaust recirculation passage and positioned between the cylinder banks.

11. An exhaust gas recirculation system as defined in claim 10 in which the intake passages extending to the cylinders in one cylinder bank and those extending to the cylinders in the other cylinder bank cross in the middle between the cylinder banks, and said proximate portions are the portions of the intake passages which are aligned with each other in the direction of the crankshaft.

12. An exhaust gas recirculation system as defined in claim 11 in which said exhaust recirculation passage extends along the lower sides of the proximate portions.

13. An exhaust gas recirculation system as defined in claim 11 in which said exhaust recirculation passage extends along the upper sides of the proximate portions.

14. An exhaust gas recirculation system as defined in claim 1 in which said intake passages and the exhaust recirculation passage are molded integrally.

15. An exhaust gas recirculation system as defined in claim 14 in which said exhaust recirculation passage extends along the lower sides of the proximate portions.

16. An exhaust gas recirculation system as defined in claim 15 in which said intake passages are communicated with a single surge tank provided between the cylinder banks, and said proximate portions of the respective intake passages are positioned downstream of the surge tank.

17. An exhaust gas recirculation system as defined in claim 14 in which the intake passages extending to the cylinders in one cylinder bank and those extending to the cylinders in the other cylinder bank cross in the middle between the cylinder banks, and said proximate portions are the portions of the intake passages which are aligned with each other in the direction of the crankshaft.

18. An exhaust gas recirculation system as defined in claim 17 in which said exhaust recirculation passage extends along the lower sides of the proximate portions.

19. An exhaust gas recirculation system as defined in claim 17 in which said exhaust recirculation passage extends along the upper sides of the proximate portions.

* * * * *